(12) United States Patent
Bremser et al.

(10) Patent No.: US 11,389,823 B2
(45) Date of Patent: *Jul. 19, 2022

(54) PROCESS FOR COATING METALLIC SURFACES OF SUBSTRATES AND ARTICLES COATED BY THIS PROCESS

(71) Applicant: CHEMETALL GMBH, Frankfurt am Main (DE)

(72) Inventors: Wolfgang Bremser, Paderborn (DE); Martin Droll, Schlangen (DE); Oliver Seewald, Marsberg (DE); Evgenija Niesen-Warkentin, Soest (DE); Lars Schachtsiek, Paderborn (DE); Manuel Traut, Hamm (DE); Michael Schwamb, Frankfurt (DE); Daniel Wasserfallen, Mainz (DE); Vera Sotke, Schwalbach am Taunus (DE); Aliaksandr Frenkel, Offenbach (DE); Ron Eilinghoff, Frankfurt (DE); Stephanie Gerold, Paderborn (DE); Nawel Khelfallah, Frankfurt (DE)

(73) Assignee: CHEMETALL GMBH, Frankfurt am Main (DE)

( * ) Notice: Subject to any disclaimer, the term of this patent is extended or adjusted under 35 U.S.C. 154(b) by 559 days.

This patent is subject to a terminal disclaimer.

(21) Appl. No.: 15/121,998

(22) PCT Filed: Feb. 27, 2015

(86) PCT No.: PCT/EP2015/054105
§ 371 (c)(1),
(2) Date: Aug. 26, 2016

(87) PCT Pub. No.: WO2015/128449
PCT Pub. Date: Sep. 3, 2015

(65) Prior Publication Data
US 2017/0066009 A1   Mar. 9, 2017

(30) Foreign Application Priority Data

Feb. 27, 2014  (DE) .................... 10 2014 203 515.5

(51) Int. Cl.
*B05D 7/00* (2006.01)
*C09D 175/04* (2006.01)
*B05D 3/02* (2006.01)
*B05D 1/18* (2006.01)
*B05D 7/14* (2006.01)
*C09D 5/08* (2006.01)
*C09D 133/08* (2006.01)
*C09D 163/00* (2006.01)
*C23F 11/173* (2006.01)

(52) U.S. Cl.
CPC .................. *B05D 1/18* (2013.01); *B05D 7/14* (2013.01); *B05D 7/542* (2013.01); *C09D 5/08* (2013.01); *C09D 133/08* (2013.01); *C09D 163/00* (2013.01); *C09D 175/04* (2013.01); *C23F 11/173* (2013.01); *B05D 3/0254* (2013.01); *B05D 2401/20* (2013.01)

(58) Field of Classification Search
CPC ...... B05D 1/18; B05D 7/542; B05D 2401/20; B05D 3/0254; B05D 7/14; B05D 3/025; C09D 133/08; C09D 163/00; C09D 175/04; C09D 5/08; C23F 11/173
See application file for complete search history.

(56) References Cited

U.S. PATENT DOCUMENTS

| | | | |
|---|---|---|---|
| 5,916,485 A | 6/1999 | Besenhard et al. | |
| 9,556,523 B2 * | 1/2017 | Wasserfallen | B05D 7/142 |
| 2009/0017210 A1* | 1/2009 | Andrianov | A61K 9/0021 |
| | | | 427/256 |
| 2009/0288738 A1* | 11/2009 | Brouwer | C02F 1/42 |
| | | | 148/247 |
| 2010/0272986 A1* | 10/2010 | Dutt | B05D 5/068 |
| | | | 428/323 |
| 2011/0070429 A1* | 3/2011 | Rochester | C09D 5/084 |
| | | | 428/336 |
| 2013/0344310 A1 | 12/2013 | Wasserfallen et al. | |
| 2014/0004266 A1 | 1/2014 | Wasserfallen et al. | |
| 2014/0190557 A1* | 7/2014 | Kameda | C09D 183/02 |
| | | | 136/251 |

(Continued)

FOREIGN PATENT DOCUMENTS

| DE | 10 2011 053 509 A1 | 3/2012 |
|---|---|---|
| DE | 10 2013 201 966 A1 | 8/2013 |

(Continued)

OTHER PUBLICATIONS

Braccini, Isabelle et al., "Molecular Basis of Ca2+-Induced Gelation in Alginates and Pectins: The Egg-Box Model Revisited", Biomacromolecules 2001, 2, pp. 1089-1096.

(Continued)

*Primary Examiner* — Francisco W Tschen
(74) *Attorney, Agent, or Firm* — Armstrong Teasdale LLP

(57) ABSTRACT

A method for coating metallic surfaces of substrates with surfaces of aqueous (coating) compositions in the form of a dispersion and/or a suspension containing at least one stabilized binder and a gelling agent, the cations having been dissolved out of the metallic surface of the substrate in a pretreatment stage and/or during the contacting. The invention further relates to such a coating based on an ionogenic gel, in which the coating is formed by a process further described herein.

17 Claims, No Drawings

(56) References Cited

U.S. PATENT DOCUMENTS

2015/0079277 A1    3/2015   Wasserfallen et al.
2017/0009087 A1 *  1/2017   Hohmann ................ C09D 7/80

FOREIGN PATENT DOCUMENTS

| DE | 10 2014 213 873 A1 | 1/2015 | |
|---|---|---|---|
| EP | 0 616 720 B1 | 9/1994 | |
| WO | 2008/035975 A2 | 3/2008 | |
| WO | WO-2012034974 A1 * | 3/2012 | ............. B05D 7/142 |
| WO | WO-2013117611 A1 * | 8/2013 | ............. B05D 7/142 |
| WO | 2015/004256 A1 | 1/2015 | |
| WO | 2015/007789 A2 | 1/2015 | |
| WO | WO-2015113530 A1 * | 8/2015 | ............... C09D 7/47 |

OTHER PUBLICATIONS

Siew, Chee Kiong et al., "New Insights into the Mechanism of Gelation of Alginate and Pectin: Charge Annihilation and Reversal Mechanism", Biomacromolecules 2005, 6, pp. 963-969.

* cited by examiner

PROCESS FOR COATING METALLIC SURFACES OF SUBSTRATES AND ARTICLES COATED BY THIS PROCESS

REFERENCE TO RELATED APPLICATIONS

This is a National Stage entry of International Patent Application PCT/EP2015/054105, filed on Feb. 27, 2015, which application claims priority from German Application No. 10 2014 203 515.5, filed Feb. 27, 2014. Each patent application identified above is incorporated herein by reference in its entirety.

THE INVENTION

The invention relates to a process for coating surfaces, a corresponding coating and use of the articles coated by this process. There are numerous methods for creating homogenous coatings on metallic surfaces, in particular by means of immersion processes. The following techniques are preferably used to create anticorrosion coatings in particular, consisting primarily of an organic matrix as well as organic and inorganic additive components.

The traditional processes are based on the use of the rheological properties of the formulations that are used in order to achieve a complete coating of a joined workpiece. Although an accumulation of coating materials at critical locations can be reduced by continuous rotation of the respective workpiece after the immersion process, it is impossible to achieve a completely homogenous coating by this method. In addition, in locations with higher coating amounts, defects such as bubbles and blistering, which have a negative effect on the quality of the coating as a whole, may occur during the drying and/or crosslinking processes.

Electrophoretic processes avoid these problems by using electric current to deposit a uniform coating during immersion. This process makes it possible to create largely homogenous coatings on metallic workpieces. The coatings deposited have extremely good adhesion to the metallic substrate when wet, so that the workpiece can be treated in a downstream rinsing step without detachment of the coating. As a result, the aforementioned locations on the workpiece, which are difficult to access, can be freed of any supernatant coating solution and therefore no defects can develop during the drying process. This technique has the disadvantage that, in addition to the required amount of electricity and in addition to suitable dip tanks, which result in higher costs, the phenomenon of the coating running away from the edges may also occur with these coatings, because electrostatic fields can be created heterogeneously on macroscopic edges and the edges may be coated unevenly and possibly even incompletely. Cavities must also be avoided in construction of the workpieces, because an effect comparable to the Faraday cage phenomenon occurs in these locations. Because of the reduced electrical field strength required for cutting, only a greatly reduced coating or none at all can be applied to the workpiece in such regions by this method (wrap-around problem), which thus has a negative effect on the quality of the coating. In addition, this technique has the following disadvantages in electrical dip coating (EDC) methods, such as cathodic dip coating (CDC), for example: a corresponding immersion bath, together with all the electrical and mechanical equipment, has a very complex design, from the temperature control, power supply and electrical insulation, circulation equipment and dosing equipment to the disposal of the anolyte acid, which is formed in the electrolytic coating, and including an ultrafiltration unit for paint recycling and control equipment. The process management also requires a very high technological complexity because of the high amperage involved and the amount of energy consumed as well as in balancing the electrical parameters over the volume of the bath and accurate adjustment of all process parameters in both maintenance and cleaning of the installation.

With known autophoretic processes, an emulsion is coagulated on the basis of a currentless concept, consisting of a pickling attack on the substrate surface, which is used, in which metal ions are dissolved out of the surface and an emulsion is coagulated because of the concentration of metallic ions at the resulting interface. Although these processes do not have the restriction of the electrolytic processes mentioned above with respect to the Faraday cage effect, the coatings formed in this process must be fixed in a complicated multistage immersion process after the first activation step. The pickling attack therefore results in unavoidable contamination of the active zone by metal ions that must be removed from the zones. Furthermore, the method is based on a chemical deposition process, which is not self-regulating and cannot be terminated as needed, as is the case, for example, when the electrical current is cut off in the electrolytic process. Thus, with a longer dwell time of the metallic substrates in the active zones, development of an excessively great layer thickness is unavoidable.

One wish that has been pursued for a long time is to efficiently and inexpensively form homogenous coatings in an immersion process, to thereby produce coatings which are as closed as possible and are essentially planar while having a greater thickness.

A process for coating substrates and the articles coated by this process are known from the document DE 102014213873 A1, in which cleaned surfaces of substrates are brought into contact with an aqueous composition in the form of a dispersion and/or suspension and coated and then after the drying of the organic coating, a coating can be performed using a similar or additional coating composition before the drying and/or baking process. The essential feature of this process is that, before coating with an aqueous composition in the form of a dispersion and/or suspension, the substrate is coated with a colloidal silicatic sol that incorporates polyvalent metal cations or is coated with a silane- or silicate-modified polymer.

The invention relates to a process for coating metallic surfaces of substrates with aqueous compositions, hereinafter also referred to as coating compositions, in the form of a dispersion and/or a suspension containing at least one stabilized binder and a gelling agent and with the cations dissolved out of the metallic surface in a pretreatment stage and/or during the contacting, and the invention also relates to such a coating based on an ionogenic gel, in which the coating is formed by:

I. Providing a substrate with a cleaned metallic surface,
II. Contacting and coating the metallic surface with a first aqueous composition in the form of a dispersion or suspension,
III. Optionally rinsing the organic coating,
IV. Optionally drying the organic coating, and
V. Coating with at least one additional coating composition before drying and crosslinking all applied layers, wherein the stabilized binder must fulfill the conditions that
a) an aqueous mixture of deionized water, 0.2% to 2% by weight of the gelling agent and 5% to 20% by weight of the stabilized binder
b) is adjusted to a pH of 1 to 7;

c) a cleaned substrate is immersed in the mixture according to b) for at least 1 minute at room temperature, and
d) a check is performed on whether an organic coating of at least 1 µm has been deposited, wherein
e) an additional test without a gelling agent is performed by preparing a mixture of deionized water and 5% to 20% by weight of the dispersion to be tested;
f) the mixture prepared under e) is also adjusted to a pH of 1 to 7, and
g) the test described under c) and d) is repeated.

It has surprisingly been found that the substrates with metallic surfaces form a coating based on an ionogenic gel in the treatment with the aqueous composition of a stabilized binder selected according to the invention and a gelling agent with the cations dissolved out of the metallic surface during the contact, and that the ionogenic gel layer deposited on the substrate allows diffusion of additional cations dissolved out of the metallic surface, so that coating can take place with additional coating compositions according to the invention in additional coating baths/steps.

Stabilized binders, which meet the following conditions, are preferably selected:
a) an aqueous mixture of deionized water, 0.3% to 1% by weight of the gelling agent and 7% to 15% by weight of the stabilized binder
b) is adjusted to a pH of 1.5 to 5 with the help of a mineral acid;
c) a cleaned substrate is immersed in the mixture according to b) for 2 to 15 minutes at room temperature, and
d) a check is performed on whether deposition of an organic coating of at least 2 µm has taken place, wherein
e) an additional test is also carried out without a gelling agent in which a mixture of deionized water and 7% to 15% by weight of the dispersion to be tested is prepared;
f) the mixture prepared according to e) is also adjusted to a pH of 1.5 to 5 with mineral acid, and
g) the test described in c) and d) is repeated.

The stabilized binders are especially preferably selected from the group consisting of nonionically stabilized polyepoxy dispersions, nonionically stabilized polyurethane dispersions and ionically stabilized polyacrylate dispersions.

The aqueous compositions preferably contain stabilized dispersions with a solids content of 20% to 90% by weight, having a viscosity of 100 to 5000 mPas, a density of 1.0 to 1.2 g/cm$^3$ and a pH in the range of 0.5 to 10 in an amount of 0.01% to 80.0% by weight, based on the total mass of the resulting mixture and at least one gelling agent in an amount of 0.001% to 20.0% by weight, based on the total mass of the resulting mixture.

The aqueous compositions additionally especially preferably contain one or more representatives selected from the following groups:
a) a crosslinking agent selected from the group consisting of silanes, siloxanes, phenolic resin types or amines in an amount of 0.01 g/L to 50 g/L,
b) complex titanium and/or zirconium fluorides in an amount of 0.01 g/L to 50 g/L,
c) an amount of at least one foam suppressant, and
d) at least one additive, selected from the group consisting of pigments, biocides, dispersion aids, film-forming aids, aids for adjusting the pH, thickeners and flow control agents.

The gelling agent preferably contains or consists of the following selected from: a) at least one polysaccharide based on glycogens, amyloses, amylopectins, calloses, agar, algins, alginates, pectins, carrageenan, celluloses, chitins, chitosans, curdlans, dextrans, fructans, collagens, gellan gum, gum arabic, starches, xanthans, gum tragacanth, karaya gums, tara gums and glucomannans; b) at least one anionic polyelectrolyte of natural origin based on polyamino acids, collagens, polypeptides, lignins or c) at least one synthetic anionic polyelectrolyte, based on polyamino acids, polyacrylic acids, polyacrylic acid copolymers, acrylamide copolymers, lignins, polyvinyl sulfonic acid, polycarboxylic acids, polyphosphoric acids or polystyrenes.

The aqueous compositions and the organic coatings produced from them especially preferably contain at least one anionic polysaccharide selected from those with a degree of esterification of the carboxyl function in the range of 5% to 75%, based on the total number of alcohol groups and carboxyl groups.

Most especially preferably the aqueous compositions and the organic coatings produced from them contain at least one anionic polysaccharide or at least one anionic polyelectrolyte, selected from those with a molecular weight in the range of 500 to 1,000,000 g/mol$^{-1}$.

The aqueous compositions and the organic coatings produced from them contain at least one anionic polysaccharide or at least one anionic polyelectrolyte selected from those with a degree of amidation of the carboxyl functions in the range of 1% to 50% or a degree of epoxidation of the carboxyl functions of up to 80%.

The anionic polyelectrolytes are preferably modified with adhesive groups selected from the group consisting of chemical groups of multifunctional epoxies, isocyanates, primary amines, secondary amines, tertiary amines, quaternary amines, amides, imides, imidazoles, formamides, Michael reaction products, carbodiimides, carbenes, cyclic carbenes, cyclocarbonates, multifunctional carboxylic acids, amino acids, nucleic acids, methacrylamides, polyacrylic acids, polyacrylic acid derivatives, polyvinyl alcohols, polyphenols, polyols with at least one alkyl group and/or aryl group, caprolactam, phosphoric acids, phosphoric acid esters, epoxy esters, sulfonic acids, sulfonic acid esters, vinyl sulfonic acids, vinyl phosphonic acids, catechol, silanes as well as the silanols and/or siloxanes produced from them, triazines, thiazoles, thiazines, dithiazines, acetals, hemiacetals, quinones, saturated fatty acids, unsaturated fatty acids, alkyds, esters, polyesters, ethers, glycols, cyclic ethers, crown ethers, anhydrides as well as acetyl acetones and β-diketo groups, carbonyl groups and hydroxyl groups.

The aqueous compositions and the organic coatings produced from them especially preferably contain at least one complexing agent from metal cations or a polymer which is modified to complex metal cations.

The aqueous compositions and the organic coatings produced from them most especially preferably contain at least one complexing agent selected from those based on maleic acid, alendronic acid, itaconic acid, citraconic acid or mesaconic acid or the anhydrides or hemiesters of these carboxylic acids.

The aqueous compositions and the organic coatings produced from them contain at least one type of cations selected from those based on cationic salts selected from the group consisting of melamine salts, nitroso salts, oxonium salts, ammonium salts, salts with quaternary nitrogen cations, salts of ammonium derivatives and metal salts of Ag, Al, Ba, Ca, Co, Cu, Fe, In, Mg, Mn, Mo, Ni, Pb, Sn, Ta, Ti, V, W, Zn and/or Zr.

The aqueous compositions preferably contain a crosslinking agent selected from the group consisting of silanes, siloxanes, phenolic resin type or amines in an amount of 0.01 g/L to 50 g/L.

The aqueous compositions especially preferably contain complex titanium and/or zirconium fluorides in an amount of 0.01 g/L to 50 g/L.

The aqueous compositions especially preferably contain complex titanium and/or zirconium fluorides in an amount of 0.1 g/L to 30 g/L.

The aqueous compositions contain at least one foam suppressant.

The aqueous compositions may also contain at least one additive selected from the group consisting of pigments, biocides, dispersant aids, film-forming aids, aids for adjusting the pH, thickeners and flow control agents.

The metallic surfaces are preferably cleaned, pickled or pretreated before contacting and coating the metallic surfaces with an aqueous composition in process step II.

Each of the aqueous compositions in the process according to the invention will preferably form a coating based on an ionogenic gel, wherein the layer thickness of all the deposited coatings after drying and crosslinking all the applied layers is in the range of 3 to 500 μm, preferably 5 to 300 μm and especially preferably 8 to 100 μm and 2 to 10, preferably 3 to 5 layers are deposited.

The individual organic coatings are formed in 0.05 to 20 minutes in the immersion bath and each has a dry film thickness in the range of 1 to 100 μm, preferably from 3 to 60 μm and especially preferably 5 to 30 μm after drying.

The invention also relates to aqueous compositions for use in the process according to the invention, each consisting of a mixture of at least one stabilized dispersion with a solids content of 30% to 90% by weight, a viscosity of 100 to 5000 mPas and a density of 1.0 to 1.2 g/cm$^3$ in an amount of 0.01% to 80.0% by weight, based on the total mass of the resulting mixture with a gelling agent in an amount of 0.001% to 20.0% by weight, based on the total mass of the resulting mixture, wherein the aqueous compositions have a pH in the range of 1 to 7.

The aqueous compositions also preferably contain one or more representatives, selected from the following groups:
a) a crosslinking agent selected from the group consisting of silanes, siloxanes, phenolic resin types or amines in an amount of 0.01 g/L to 50 g/L,
b) complex titanium and/or zirconium fluorides in an amount of 0.01 g/L to 50 g/L,
c) an amount of at least one foam suppressant and
d) an additive selected from the group consisting of pigments, biocides, dispersant aids, film-forming aids, aids for adjusting the pH, thickeners and flow control agents.

The coating according to the invention may preferably be used for coated substrates as wire, braided wire, strip, sheet, section, lining, part of a vehicle or airplane body, element for a household appliance, element in construction, framework, guide rail, heating element or fence element, molded part of a complex geometry or small part such as screw, nut, flange or spring. This coating is especially preferably used in automotive engineering, in construction, for construction of household appliances, equipment design or in heating engineering. Use of the process according to the invention is especially preferred for coating substrates, which pose problems in coating by electrodip coating.

The invention is explained in greater detail below on the basis of examples without thereby restricting the general teaching according to claim 1 of the invention.

EXAMPLES

First a general description of the materials used and the procedure for carrying out the process:
A. Substrates:
   Electrolytically galvanized steel plate with a zinc layer application of 5 μm, sheet metal thickness 0.81 mm,
   2. Cold rolled steel, sheet metal thickness approximately 0.8 mm,
   3. Aluminum alloy of the quality class AC 170, sheet metal thickness approximately 1.0 mm
B. Alkaline Cleaning:
   1. 30 g/L Gardoclean® S 5176 and 4 g/L Gardobond® additive H 7406 from Chemetall GmbH prepared in tap water. The sheet metal plates were cleaned for 180 s in a spray bath at 60° C. and then rinsed for 120 s with tap water and 120 s with deionized water in an immersion bath.
C. Pretreatment:
   Pretreatment based on zinc phosphate (Gardobond 26S from Chemetall GmbH)
   2. Pretreatment based on silane (Oxsilan 9810/2 from Chemetall GmbH)

Coating the surfaces with formulations according to the invention for forming the organic coating:

All mixtures were applied to the respective substrate by means of immersion bath at room temperature within 5 minutes.

D. Ingredients of the Formulation:

All data in the following table refers to the percentage amount by weight in the as-delivered form of the respective components. The percentage amount of the deionized water contained therein corresponds to the difference from the sum of the amounts given in the table to a total of 100% by weight.

a) Binders used (polymer dispersions/suspensions)
1. Dispersion A
   Nonionically stabilized polyepoxy dispersion with a solids content of 45% to 49%, a pH of 5.0 to 6.0, a viscosity of 1000-2000 mPas, an epoxy equivalent of 2300-2800 and a density of 1.1 g/cm$^3$.
2. Dispersion B
   Nonionically stabilized polyurethane dispersion with a solids content of 30%, a pH of 3.0-6.0, a viscosity of 300-2000 mPas and a density of 1.1 g/cm$^3$.
3. Dispersion C
   Ionically stabilized polyacrylate dispersion with a solids content of 50%, a pH of 7.5-8.5, a viscosity of 200 mPas, a density of 1.05 g/cm$^3$.

b) Gelling agents used
1. Gelling Agent A
   A 1:1 mixture of a polysaccharide with a molecular weight of approximately 70,000 g/mol, a degree of amidation of 11%, a degree of esterification of 10%, a degree of epoxidation of 0%, a galacturonic acid content of 88% and a polysaccharide with a molecular weight of approximately 70,000 g/mol, a degree of amidation of 0%, a degree of esterification of 38%, a degree of epoxidation of 0%, a galacturonic acid content of 85% was used as the gelling agent. To prepare the formulation, a 2% aqueous solution of the polysaccharide was used.
2. Gelling Agent B
   A polysaccharide with a molecular weight of approximately 70,000 g/mol, a degree of amidation of 0%, a degree of esterification of 15%, a degree of epoxidation of 0%, a galacturonic acid content of 85% was used as the gelling agent. To prepare the formulation, a 2% aqueous solution of the polysaccharide was used.

c) Pigments
1. Gas black-RCC pigment paste based on a dispersion resin for applications in aqueous coating systems with pH values in the acidic range with a pigment content of 4%, a filler content of 50%, a 10% dispersion additive content with a resulting solids content of approximately 60%
2. Micronized white pigment based on a titanium dioxide rutile, organically and inorganically coated
3. Iron oxide red, opaque, in an aqueous dispersion with color index of pigment red 101/77 491 with a pH of 7-10 and a density of 1.7 to 1.9 g/cm$^3$
4. Cu phthalocyanine, alpha, in aqueous dispersion, a color index of pigment blue 15:2/74 160 with a pH of 7-10 and a density of 1.1 to 1.3
5. Quinophthalone yellow, a readily flowing paste with a color index of pigment yellow 138/56 300 with a pH of 7-10 and a density of 1.3-1.4 d) Additives
1. Fluoride-containing aqueous pretreatment solutions—were not used when substrates with pretreatments (see point II) were used. Preferably used for deposition on aluminum substrates
2. Phosphoric acid as an aqueous solution (20%)
3. Foam suppressant, based on natural oils, emulsifiers and a 1% by weight content of the as-delivered form in water. The data given in the table are based on the amount of solution of liter of formulation.

Additives were preferably used when the formulations had to be adapted to the pH or foaming was observed.

Overview of the formulations used as examples.

TABLE 1

Formulation examples of the coating and coating sequence according to the invention.

| | Binder | | | Gelling agent | | Pigment | | | | | |
|---|---|---|---|---|---|---|---|---|---|---|---|
| No. | 1 | 2 | 3 | 1 | 2 | 1 | 2 | 3 | 4 | 5 | pH |
| 1 | 43.0 | | | 25.0 | | 7.0 | | | | | 5.0 |
| 2 | | 67.0 | | 25.0 | | 7.0 | | | | | 5.5 |
| 3 | | | 40.0 | 25.0 | | 7.0 | | | | | 6.5 |
| 4 | 43.0 | | | | 25.0 | 7.0 | | | | | 4.0 |
| 5 | | 67.0 | | | 25.0 | 7.0 | | | | | 4.5 |
| 6 | | | 40.0 | | 25.0 | 7.0 | | | | | 5.5 |
| 7 | 14.3 | 22.3 | 13.3 | 25.0 | | 7.0 | | | | | 5.5 |
| 8 | 14.3 | 22.3 | 13.3 | | 25.0 | 7.0 | | | | | 4.5 |
| 9 | 43.0 | | | 25.0 | | | 5.0 | | | | 5.5 |
| 10 | | 67.0 | | 25.0 | | | 5.0 | | | | 6.0 |
| 11 | | | 40.0 | 25.0 | | | 5.0 | | | | 6.5 |
| 12 | 43.0 | | | | 25.0 | | 5.0 | | | | 5.0 |
| 13 | | 67.0 | | | 25.0 | | 5.0 | | | | 5.5 |
| 14 | | | 40.0 | | 25.0 | | 5.0 | | | | 6.0 |
| 15 | 14.3 | 22.3 | 13.3 | 25.0 | | | 5.0 | | | | 6.0 |
| 16 | 14.3 | 22.3 | 13.3 | | 25.0 | | 5.0 | | | | 6.0 |
| 17 | 43.0 | | | 25.0 | | | | 1.0 | | | 5.2 |
| 18 | | 67.0 | | 25.0 | | | | 1.0 | | | 5.7 |
| 19 | | | 40.0 | 25.0 | | | | 1.0 | | | 6.7 |
| 20 | 43.0 | | | | 25.0 | | | 1.0 | | | 4.2 |
| 21 | | 67.0 | | | 25.0 | | | 1.0 | | | 4.7 |
| 22 | | | 40.0 | | 25.0 | | | 1.0 | | | 5.7 |
| 23 | 14.3 | 22.3 | 13.3 | 25.0 | | | | 1.0 | | | 5.7 |
| 24 | 14.3 | 22.3 | 13.3 | | 25.0 | | | 1.0 | | | 4.7 |
| 25 | 43.0 | | | 25.0 | | | | | 2.0 | | 5.2 |
| 26 | | 67.0 | | 25.0 | | | | | 2.0 | | 5.7 |
| 27 | | | 40.0 | 25.0 | | | | | 2.0 | | 6.7 |
| 28 | 43.0 | | | | 25.0 | | | | 2.0 | | 4.2 |
| 29 | | 67.0 | | | 25.0 | | | | 2.0 | | 4.7 |
| 30 | | | 40.0 | | 25.0 | | | | 2.0 | | 5.7 |
| 31 | 14.3 | 22.3 | 13.3 | 25.0 | | | | | 2.0 | | 5.7 |
| 32 | 14.3 | 22.3 | 13.3 | | 25.0 | | | | 2.0 | | 4.7 |
| 33 | 43.0 | | | 25.0 | | | | | | 3.0 | 5.2 |
| 34 | | 67.0 | | 25.0 | | | | | | 3.0 | 5.7 |
| 35 | | | 40.0 | 25.0 | | | | | | 3.0 | 6.7 |
| 36 | 43.0 | | | | 25.0 | | | | | 3.0 | 4.2 |
| 37 | | 67.0 | | | 25.0 | | | | | 3.0 | 4.7 |
| 38 | | | 40.0 | | 25.0 | | | | | 3.0 | 5.7 |
| 39 | 14.3 | 22.3 | 13.3 | 25.0 | | | | | | 3.0 | 5.7 |
| 40 | 14.3 | 22.3 | 13.3 | | 25.0 | | | | | 3.0 | 4.7 |

E. Rinsing the Organic Coating:

Rinsing after the organic coating serves to remove any non-adhering constituents of the formulation and accumulations of the formulation and to make the process as close to reality as possible as is customary for industrial applications.

F. Drying and Crosslinking the Coating:

Drying or drying with formation of a film, wherein film forming in the sense of the present invention is also understood to refer to baking or crosslinking the coating, in particular the organic polymer ingredients.

1. 200° C. for 20 minutes

Examples of the Coating Sequence

The following coating sequences on substrate 2 are given here as examples, although the invention is not limited to these examples:

Example 1

Step I

Step II for 120 s with formulation no. 9 (15 µm dry film thickness)

Step III for 15 s

Step II for 60 s with formulation no. 1 (5 µm dry film thickness)

Step III for 15 s

Step II for 80 s with formulation no. 10 (10 µm dry film thickness)

Step III for 15 s

Step II for 60 s with formulation no. 4 (5 µm dry film thickness)

Step III for 15 s

Step II for 60 s with formulation no. 11 (5 µm dry film thickness)

Step III for 15 s

Drying and forming of film of the coating at 170° C. for 10 minutes. A five-layer coating is obtained by using the three binders listed as examples in the different layers. The coating is clearly differentiable visually due to the pigment additives.

Example 2

Step I
Step II for 180 s with formulation no. 15 (20 μm dry film thickness)
Step III for 15 s
Step II for 60 s with formulation no. 7 (20 μm dry film thickness)
Step III for 15 s
Step II for 80 s with formulation no. 16 (20 μm dry film thickness)
Step III for 15 s
Drying and forming of film from the coating at 170° C. for 10 minutes. A three-layer coating that is clearly differentiable visually due to the pigment additives is obtained.

Example 3

Step I
Step II for 180 s with formulation no. 3 (20 μm dry film thickness)
Step III for 15 s
Step II for 60 s with formulation no. 11 (20 μm dry film thickness)
Step III for 15 s
Step II for 80 s with formulation no. 3 (20 μm dry film thickness)
Step III for 15 s
Drying and forming of film of the coating at 170° C. for 10 minutes. A three-layer coating of approximately 60 μm that is clearly differentiable visually due to the pigment additives is obtained.

The invention claimed is:

1. A process for coating metallic surfaces of substrates with aqueous organic compositions, the process comprising the steps of:
I) providing a substrate with a cleaned metallic surface,
II) contacting and coating the cleaned or pretreated metallic surface with a first aqueous organic composition in the form of a dispersion, suspension or combination thereof, the first aqueous organic composition comprising a first stabilized binder and a gelling agent, so as to form a first organic coating,
III) optionally rinsing the first organic coating,
IV) optionally drying the first organic coating, and
V) coating the first organic coating with at least two additional aqueous organic compositions each comprising a stabilized binder and a gelling agent before drying and crosslinking all applied layers, wherein at least one of the at least two additional aqueous organic compositions comprises a stabilized binder that is different from the first stabilized binder and not present in the first aqueous organic composition or a gelling agent that is different from the first gelling agent and not present in the first aqueous organic composition, wherein the respective coating compositions each must fulfill the following conditions:
a) be in the form of an aqueous mixture of deionized water, the gelling agent in an amount in the range of 0.2% to 2% by weight based on the weight of the coating composition and 5% to 20% by weight of the respective stabilized binder based on the weight of the coating composition; and
b) be adjusted to a pH in the range of 1 to 7; and wherein
c) a cleaned substrate is immersed in the aqueous mixture or at least 1 minute at room temperature, and
d) a check is performed on whether an organic coating having a thickness of at least 1 μm has been deposited on the cleaned substrate,
wherein each of the coatings forms a layer based on an ionogenic gel with cations that have been dissolved out of the metallic surface in the pretreatment stage and/or during the contacting, wherein the dry film thickness of all the deposited coatings after drying and crosslinking all of them is in the range of 3 to 500 μm, and
wherein the aqueous compositions and the organic coatings produced from them contain at least one complexing agent from metal cations or a polymer which is modified so as to complex metal cations.

2. The process according to claim 1, wherein the amount of gelling agent in a) is in the range of 0.3% to 1%, the amount of stabilized binder in a) is in the range of 7% to 15%, the pH in b) is in the range of 1.5 to 5 and is adjusted through use of a mineral acid, the immersion in c) is conducted for at least in the range of 2 to 15 minutes at room temperature, and the average thickness in d) is at least 2 μm.

3. The process according to claim 1 characterized in that each of the stabilized binders is selected from the group consisting of nonionically stabilized polyepoxy dispersions, nonionically stabilized polyurethane dispersions and ionically stabilized polyacrylate dispersions.

4. The process according to claim 1, characterized in that each of the aqueous compositions contains a stabilized dispersion with a solids content in the range of 20% to 90% by weight based on the total mass of the resulting mixture and at least one gelling agent in an amount of 0.001% to 20.0% by weight, based on the total mass of the resulting mixture, each aqueous composition having a viscosity in the range of 100 to 5000 mPas, a density in the range of 1.0 to 1.2 g/cm$^3$ and a pH in the range of 0.5 to 10.

5. The process according to claim 1, characterized in that each of the aqueous compositions additionally contains one or more of a) to d):
a) a crosslinking agent selected from the group consisting of silanes, siloxanes, phenolic resin types or amines in an amount of 0.01 g/L to 50 g/L,
b) complex titanium and/or zirconium fluorides in an amount of 0.01 g/L to 50 g/L,
c) an amount of at least one foam suppressant, and
d) at least one additive selected from the group consisting of pigments, biocides, dispersant aids, film-forming aids, acidic and/or basic aids for adjusting the pH and thickeners and flow control agents.

6. The process according to claim 1, characterized in that the gelling agent is selected from the group consisting of a) at least one polysaccharide based on glycogens, amyloses, amylopectins, calloses, agar, algins, alginates, pectins, carrageenan, celluloses, chitins, chitosans, curdlans, dextrans, fructans, collagens, gellan gum, gum arabic, starches, xanthans, gum tragacanth, karaya gums, tara gums and glucomannans; b) at least one anionic polyelectrolyte of natural origin based on polyamino acids, collagens, polypeptides, lignins and c) at least one synthetic anionic polyelectrolyte based on polyamino acids, polyacrylic acids, polyacrylic acid copolymers, acrylamide copolymers, lignins, polyvinyl sulfonic acid, polycarboxylic acids, polyphosphoric acids or polystyrenes.

7. The process according to claim 1, characterized in that the aqueous compositions and the organic coatings produced from them contain at least one anionic polysaccharide selected from those with a degree of esterification of the carboxyl function in the range of 5% to 75%, based on the total number of alcohol groups and carboxyl groups.

8. The process according to claim 1, characterized in that the aqueous compositions and the organic coatings produced from them contain at least one anionic polysaccharide and/or at least one anionic polyelectrolyte selected from those with a molecular weight in the range of 500 to 1,000,000 g/mol$^{-1}$.

9. The process according to claim 1, characterized in that the aqueous compositions and the organic coatings produced from them contain at least one anionic polysaccharide or at least one anionic polyelectrolyte selected from those with a degree of amidation of the carboxyl functions in the range of 1% to 50% or a degree of epoxidation of the carboxyl functions of up to 80%.

10. The process according to claim 1, characterized in that the aqueous compositions and the organic coatings produced from them contain anionic polyelectrolytes that are modified with adhesive groups selected from the group consisting of chemical groups of multifunctional epoxies, isocyanates, primary amines, secondary amines, tertiary amines, quaternary amines, amides, imides, imidazoles, formamides, Michael reaction products, carbodiimides, carbenes, cyclic carbenes, cyclocarbonates, multifunctional carboxylic acids, amino acids, nucleic acids, methacrylamides, polyacrylic acids, polyacrylic acid derivatives, polyvinyl alcohols, polyphenols, polyols with at least one alkyl group and/or aryl group, caprolactam, phosphoric acids, phosphoric acid esters, epoxy esters, sulfonic acids, sulfonic acid esters, vinyl sulfonic acids, vinyl phosphonic acids, catechol, silanes as well as the silanols and/or siloxanes produced therefrom and triazines, thiazoles, thiazines, dithiazines, acetals, hemiacetals, quinones, saturated fatty acids, unsaturated fatty acids, alkyds, esters, polyesters, ethers, glycols, cyclic ethers, crown ethers, anhydrides as well as acetyl acetones and β-diketo groups, carbonyl groups and hydroxyl groups.

11. The process according to claim 1, characterized in that the aqueous compositions and the organic coatings produced from them contain at least one complexing agent selected from those based on maleic acid, alendronic acid, itaconic acid, citraconic acid or mesaconic acid or the anhydrides or hemiesters of these carboxylic acids.

12. The process according to claim 1, characterized in that the aqueous compositions and the organic coatings produced from them contain at least one type of cations selected from those based on cationically active salts selected from the group consisting of melamine salts, nitroso salts, oxonium salts, ammonium salts, salts with quaternary nitrogen cations, salts of ammonium derivatives and metal salts of Ag, Al, Ba, Ca, Co, Cu, Fe, In, Mg, Mn, Mo, Ni, Pb, Sn, Ta, Ti, V, W, Zn and/or Zr.

13. The process according to claim 1, characterized in that the aqueous compositions contain complex titanium and/or zirconium fluorides in an amount in the range of 0.1 g/L to 30 g/L.

14. The process according to claim 1, characterized in that each of the aqueous compositions forms a coating based on an ionogenic gel, wherein the layer thickness of all the deposited coatings after drying and crosslinking of all the applied layers is in the range of 5 to 300 μm and 2 to 10 layers are deposited.

15. The process according to claim 1, characterized in that the individual organic coatings are formed in a time in the range of 0.05 to 20 minutes in the immersion bath and after drying they have a dry film thickness in the range of 1 to 100 μm.

16. The process according to claim 1, wherein each stabilized binder of the at least one of the at least two additional aqueous organic compositions is not present in the first aqueous organic composition.

17. The process according to claim 1, wherein each gelling agent of the at least one of the at least two additional aqueous organic compositions is not present in the first aqueous organic composition.

\* \* \* \* \*